United States Patent [19]

Hashimoto et al.

[11] Patent Number: 5,161,290
[45] Date of Patent: Nov. 10, 1992

[54] TOOL-REST DRIVING DEVICE

[75] Inventors: Mashataka Hashimoto; Michiyoshi Iwata, both of Gifu, Japan

[73] Assignee: Teijin Seiki Co., Ltd., Osaka, Japan

[21] Appl. No.: 670,335

[22] Filed: Mar. 15, 1991

[30] Foreign Application Priority Data

| Mar. 22, 1990 [JP] | Japan | 2-74569 |
| Mar. 22, 1990 [JP] | Japan | 2-74570 |
| Jun. 5, 1990 [JP] | Japan | 2-147772 |

[51] Int. Cl.$^5$ .................................. B23B 29/32
[52] U.S. Cl. ................................ 29/40; 74/819
[58] Field of Search ........ 29/39, 40, 48.5 A, 48.5 R; 408/35; 82/159, 160; 74/819, 813 R, 813 C, 826, 820; 409/231, 232, 215, 201, 217

[56] References Cited

U.S. PATENT DOCUMENTS

| 3,760,655 | 9/1973 | Buchmeier | 29/49 X |
| 4,302,870 | 12/1981 | Schalles et al. | 29/40 |
| 4,785,513 | 11/1988 | Lee et al. | 82/159 X |
| 4,847,960 | 7/1989 | Hafla et al. | 29/40 |
| 4,872,244 | 10/1989 | Schleich | 29/40 |
| 4,944,198 | 7/1990 | Natale et al. | 29/48.5 R |

Primary Examiner—William Briggs
Attorney, Agent, or Firm—Lane, Aitken & McCann

[57] ABSTRACT

A tool-rest driving device comprising a drive motor having its output shaft, a first rotatable shaft axially aligned with the motor output shaft and driven to rotate by the motor output shaft, a tool rest having at least one rotational tool, a reduction gear arranged between the first rotatable shaft and the tool rest for reducing the number of rotations of the motor output shaft, the tool rest being rotated at the reduced number of rotations, and a second rotatable shaft arranged coaxially of the motor output shaft for driving the rotational tool of the tool rest. A center axis of the rotational shaft, a center axis of the reduction gear and an axis of rotation of the tool rest are arranged on the same axis.

10 Claims, 6 Drawing Sheets

TOOL-REST DRIVING DEVICE

FIELD OF THE INVENTION

The present invention relates to a tool-rest driving device for driving a tool rest having at least one rotational tool supported thereon, and more particularly to such a device in which the size of the device is reduced.

DESCRIPTION OF THE PRIOR ART

In a conventional tool-rest driving device of a numerically controlled lathe, the dividing of the tool rest (turret head) with at least one rotational tool is performed by rotating the tool rest a predetermined angle at a time by means of a first drive motor. The tool rest is freely rotatably supported by a support structure which includes on a line extending through an axis of rotation of the tool rest a tool drive center shaft for driving a tool to rotate. The tool drive center shaft is driven to rotate by a second drive motor. A driving force from the first drive motor disposed parallel to the tool drive center shaft is transmitted through a reduction gear of the parallel shaft gear type to the tool rest. The second drive motor transmits its driving force to the rear end of the tool drive shaft through a transmission mechanism comprising a pulley mounted on the shaft end and a belt.

In the conventional tool-rest driving device described above, since the reduction gear of the parallel shaft gear type is arranged between the tool drive center shaft and the first drive motor disposed parallel to the tool drive center shaft and therefore takes up much space, there is the problem that it is difficult to reduce the size of the tool-rest driving device.

In some of the conventional tool-rest driving devices of the above type, cutting oil is supplied from an external cutting-oil supply system through a pipe, etc. which are disposed in the vicinity of the tool-rest driving device. Because of the space for the supply pipe, etc., the whole size of the tool-rest driving device is caused to be increased. Also, a hydraulic cylinder and the like are employed inside the tool rest in order to transmit and cut off the driving force between the rotational tool and the rotational tool drive shaft. In addition to the problem of increasing the size of the tool-rest driving device, there is another problem that the tool-rest driving device becomes structurally complicated. Thus, the conventional tool-rest driving devices have their disadvantages in that the devices are bulky and structurally complicated.

It is therefore an object of the present invention to provide an improved tool-rest driving device which is reduced in size and structurally simple by making structurally simple the support structure supporting the tool rest.

It is another object of the present invention to provide an improved tool-rest driving device which is reduced in size and structurally simple by making simple the structure for transmitting and cutting off the driving force between the rotational tool and the rotational tool drive shaft.

It is still another object of the present invention to provide an improved tool-rest driving device which is reduced in size and structurally simple by providing a structurally simple cutting-oil supply passageway within the tool-rest driving device.

It is yet another object of the present invention to provide an improved tool-rest driving device which is reduced in size and structurally simple by selectively driving either the tool rest or the rotational tool drive shaft by means of a single drive motor.

SUMMARY OF THE INVENTION

In accordance with one important aspect of the present invention, there is provided a tool-rest driving device comprising a drive motor having its output shaft, a first rotatable shaft axially aligned with the motor output shaft and driven to rotate by the motor output shaft, a tool rest having at least one rotational tool, reduction gear means arranged between the first rotatable shaft and the tool rest for reducing the number of rotations of the motor output shaft, the tool rest being rotated at the reduced number of rotations, and a second rotatable shaft arranged coaxially of the motor output shaft for driving the rotational tool of the tool rest. A a center axis of the rotational shaft, a center axis of the reduction gear means and an axis of rotation of the tool rest are arranged on the same axis. The second rotatable shaft may extend through the reduction gear means. The reduction gear means may be constituted by an epicycle reduction gear comprising external tooth gears and an internal tooth gear meshing with the external tooth gears, the internal tooth gear being connected with the tool rest. The reduction gear means may also be constituted by an epicycle reduction gear comprising external tooth gears, an internal tooth gear meshing with the external tooth gears and a rotatable block rotatably supporting the external tooth gears, the external tooth gears being connected through the rotatable block to the tool rest.

In the above described device, the center axis of the rotational shaft, the center axis of the reduction means and the axis of rotation of the tool rest are arranged on the same axis. Consequently, the device can be reduced in size and made structurally simple.

In accordance with another important aspect of the present invention, there is provided a tool-rest driving device comprising a single drive motor having an axis of rotation, a tool rest having an axis of rotation axially aligned with the axis of rotation of the single drive motor and having a plurality of rotational tools supported thereon, a support structure including a first support block having the tool rest freely rotatably supported thereon and a second support block having the single drive motor fixed thereto, and an epicycle reduction gear attached to the first support block of the support structure for reducing the number of rotations of the single drive motor, the tool rest being rotated at the reduced number of rotations. The tool-rest driving device further comprises a plurality of tool drive units rotatably supported on the tool rest for driving the rotational tools, a rotational tool drive shaft having an axis of rotation axially aligned with the axis of rotation of the single drive motor and extending through a central portion of the epicycle reduction gear and driving the tool drive units, and power-transmission switch means provided in the second support block for transmitting a driving force from the single drive motor selectively either to the epicycle reduction gear or to the rotational tool drive shaft.

Since in the above described device there is provided the power-transmission switch means, the epicycle reduction gear or the rotational tool drive shaft is selectively driven by means of the single drive motor. As a result, the device can be reduced in size and made structurally simple.

In accordance with yet another important aspect of the present invention, there is provided a tool-rest driving device comprising a drive motor having an axis of rotation, a tool rest having an axis of rotation axially aligned with the axis of rotation of the drive motor and having a plurality of rotational tools supported thereon, a support block having the tool rest freely rotatably supported thereon, and an epicycle reduction gear attached to the support block for reducing the number of rotations of the drive motor, the tool rest being rotated at the reduced number of rotations. A plurality of tool drive units are rotatably supported on the tool rest for driving the rotational tools. A rotational tool drive shaft has an axis of rotation axially aligned with the axis of rotation of the drive motor and extends through a central portion of the epicycle reduction gear and driving the tool drive units. An axially movable clutch rod extends through the support block in parallel relationship with the axis of rotation of the rotational tool drive shaft. Each of the tool drive units includes an axially movable tool rotating shaft, and when the axially movable clutch rod is axially moved toward the axially movable tool rotating shaft and brought into contact with the axially movable tool rotating shaft, a power transmission path from the rotational tool drive shaft to the tool drive unit is connected.

In the above described device, when the axially movable clutch rod is axially moved toward the axially movable tool rotating shaft and brought into contact with the axially movable tool rotating shaft, a power transmission path from the rotational tool drive shaft to the tool drive unit is connected. Accordingly, the structure for connecting and disconnecting the power transmission path can be made structurally simple.

The foregoing objects are also accomplished in accordance with the present invention by providing a tool-rest driving device comprising a drive motor having an axis of rotation, a tool rest having an axis of rotation axially aligned with the axis of rotation of the drive motor and having a plurality of rotational tools supported thereon, a support block having the tool rest freely rotatably supported thereon, and an epicycle reduction gear attached to the support block for reducing the number of rotations of the drive motor, the tool rest being rotated at the reduced number of rotations. The tool-rest driving device further comprises a plurality of tool drive units rotatably supported on the tool rest for driving the rotational tools, a rotational tool drive shaft having an axis of rotation axially aligned with the axis of rotation of the drive motor and extending through a central portion of the epicycle reduction gear and driving the tool drive units, and a cutting-oil supply mechanism for supplying cutting oil to the tools supported on the tool rest. The cutting-oil supply mechanism includes a cutting-oil supply pipe having its one end portion projecting from the drive motor, its intermediate portion extending through the drive motor and its other end portion inserted into the tool rest, a plurality of cutting-oil passageways extending radially from a central portion of the tool rest, and a valve for communicating the cutting-oil supply pipe with one of the plurality of cutting-oil passageways which corresponds to a rotational position into which the tool rest is rotated.

In the above described device, the cutting-oil supply mechanism for supplying cutting oil to the tools is supported on the tool rest. Accordingly the device can be reduced in size and made structurally simple.

The foregoing objects are also accomplished in accordance with the present invention by providing a drive device comprising a single drive motor having its output shaft, a first rotatable and axially movable shaft axially aligned with the motor output shaft and driven to rotate by the motor output shaft, a second rotatable and axially movable shaft arranged coaxially of the motor output shaft and driven to rotate by the motor output shaft, and power-transmission switch means interposed between the single drive motor and the first and second rotatable and axially movable shafts for selectively transmitting a driving force from the motor output shaft either to the first rotatable and axially movable shaft or to the second rotatable and axially movable shaft. The driving force from the motor output shaft is transmitted to the first shaft when the second shaft is axially moved in one direction by the power-transmission switch means and being transmitted to the second shaft when the second shaft is axially moved in another direction by the power-transmission switch means.

Since, in the drive device described above, the first rotational shaft or the second rotational shaft is selectively driven by means of the single drive motor, the devices can be reduced in size and made structurally simple.

The foregoing objects are also accomplished in accordance with the present invention by providing a tool-rest driving device comprising a single drive motor, a tool rest having at least one rotational tool and driven to rotate by the single drive motor, a tool drive shaft driven to rotate by the single drive motor for rotating the rotational tool supported on the tool rest, and power-transmission switch means interposed between the single drive motor and the tool drive shaft and tool rest for selectively transmitting a driving force from the single drive motor either to the tool rest or to the tool drive shaft. The tool drive shaft has a center axis axially aligned with an axis of rotation of the tool rest and which further comprises a reduction gear having input and output members, the driving force from the single drive motor being transmitted through the reduction gear to the tool rest. The the tool rest is servo locked in a predetermined rotational position by maintaining a rotational stop position of the drive motor.

In the above described device, the driving force from the single drive motor is selectively transmitted either to the tool rest or to the tool drive shaft by the power-transmission switch means. Consequently, the size of the device can be reduced. In addition, the tool drive shaft has a center axis axially aligned with the axis of rotation of the tool rest and the device further comprises a reduction gear having input and output members, the driving force from the single drive motor being transmitted through the reduction gear to the tool rest. Consequently, the device can be made structurally simple. In addition, the tool rest can be servo locked in the predetermined rotational position. Consequently, the stepless dividing of the tool rest can be performed.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
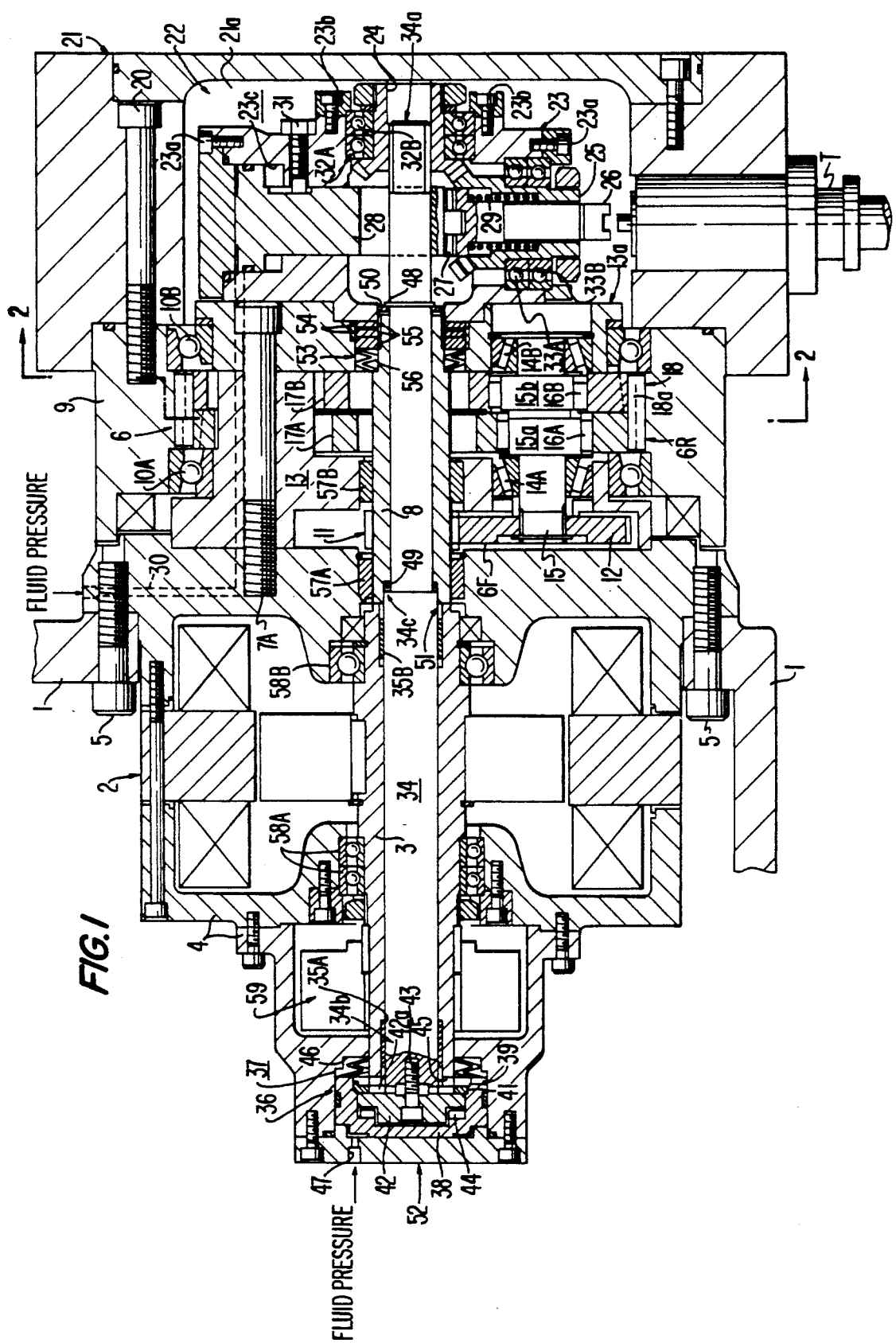
FIG. 1 is a longitudinal cross-sectional view showing a first embodiment of a tool-rest driving device in accordance with the subject invention.
Figure 2:
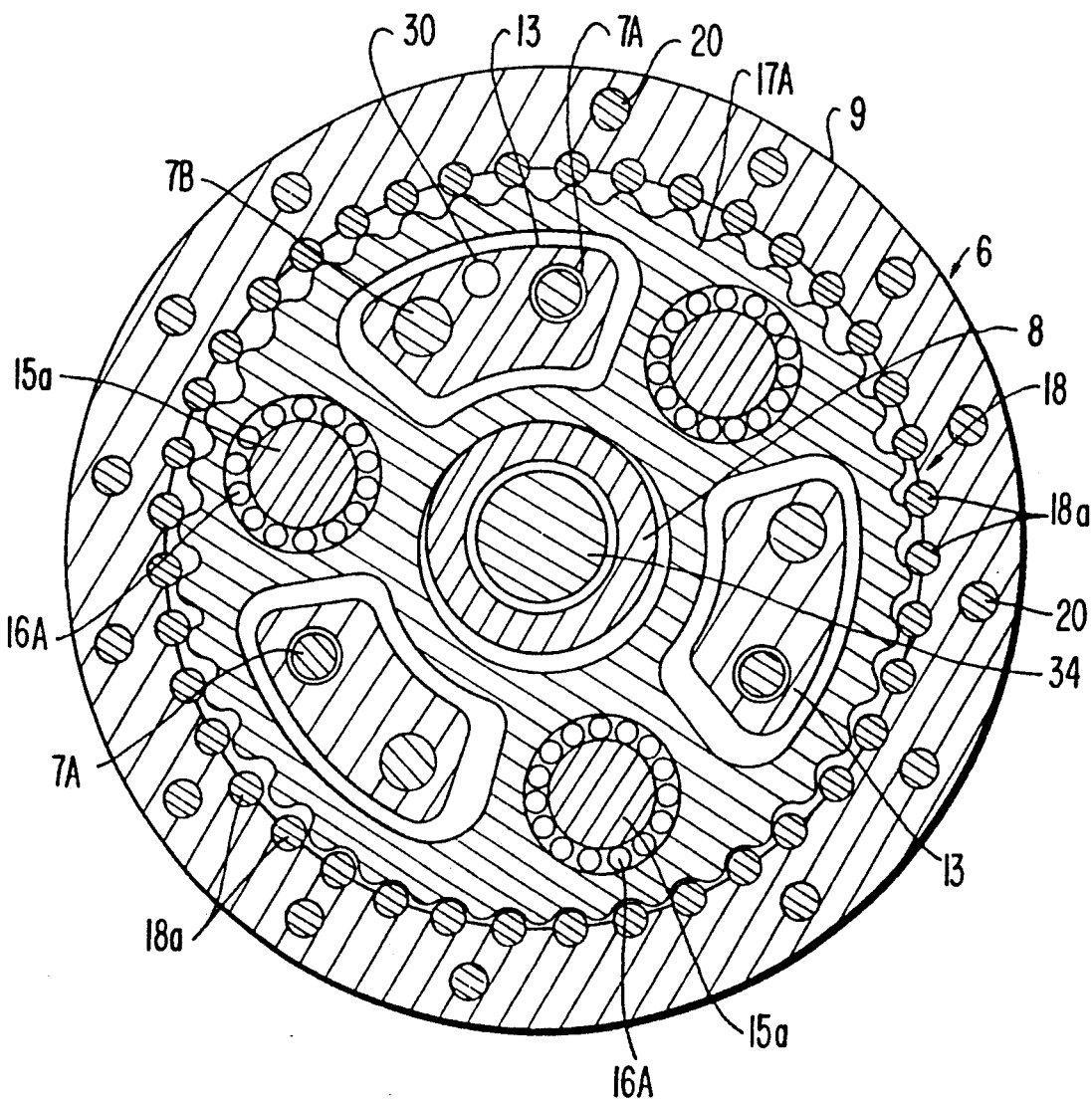
FIG. 2 is a cross-sectional view taken on line A—A of FIG. 1.

Referring more particularly to the drawings where the showings are for the purpose of illustrating preferred embodiments of the invention only and not for the purpose of limiting same, FIGS. 1 and 2 show the invention incorporated in the tool-rest driving device of a numerically controlled lathe.

In FIGS. 1 and 2, reference numeral 1 is a frame of the tool-rest driving device and reference numeral 2 is an electric servo motor with a hollow cylindrical output shaft 3. The casing 4 of the servo motor 2 is fastened to the frame 1 by means of a plurality of bolts 5. An epicycle reduction gear 6 is fastened to the frame 1 by means of a plurality of bolts 7A and pins 7B (FIG. 2). The driving force from the servo motor 2 is transmitted to the epicycle reduction gear 6 through the motor output shaft 3 and through a tool-rest drive input shaft (input shaft) 8 axially aligned with the motor output shaft 3. The rotational speed transmitted to the tool-rest drive input shaft 8 is reduced and outputted through an annular ring 9 (output shaft) arranged coaxially of the tool-rest drive input shaft 8. The epicycle reduction gear 6 comprises a primary reduction gear part 6F and a secondary reduction gear part 6R. The primary reduction gear part 6F is constituted by a first input gear 11 mounted on the tool-rest drive input shaft 8 and a second input gear 12 meshing with the first input gear 11 and larger in teeth than the first gear 11. Three fixed blocks 13 (fixed members) and a cover plate 13a are fastened to the motor casing 4 and have an annular ring 9 freely rotatably supported thereon through bearings 10A and 10B. Each of three crank shafts 15 has a pair of circular eccentric portions 15a and 15b different in phase by 180° and is rotatably supported to the corresponding fixed block 13 and the cover plate 13a through bearings 14A and 14B. As clearly shown in FIG. 2, each crank shaft 15 is disposed between two adjacent fixed blocks 13 and 13. A pair of external tooth gears 17A and 17B are supported on the circular eccentric portions 15a and 15b through bearing 16A and 16B, respectively, so that the external tooth gears 17A and 17B are revolved with different phases of 180° around the tool-rest drive input shaft 8, as the crank shafts 15 are rotated. An internal tooth gear 18 is formed in the inner surface of the annular ring 9 and meshes with the external tooth gears 17A and 17B. The internal tooth gear 18 has a plurality of internal teeth (pins) 18a which are slightly increased in number than the external teeth of each of the external tooth gears 17A and 17B. The above described fixed blocks 13, crank shafts 15, external tooth gears 17A, 17B and internal tooth gear 18 as a whole constitute the secondary reduction gear part 6R of the epicycle reduction gear 6. If the external tooth gears 17A and 17B are revolved around the tool-rest drive input shaft 8, the annular ring 9 will be rotated a small angle at a time in accordance with a difference in teeth between the external tooth gears 17A, 17B and the internal tooth gear 18. This rotation of the annular ring 9 causes a tool rest 21 to rotate. As will be described later in detail, a driving force of the servo motor 2 is transmitted to the epicycle reduction gear 6 as the tool-rest drive input shaft 8 clutch engages with the motor output shaft 3.

The tool rest 21 is fastened to the annular ring 9 by means of a plurality of bolts 20 so that the tool rest 21 and the annular ring 9 can rotate on their axis of rotation axially aligned with an axis of rotation of the motor output shaft 3, as a unit member. The tool rest 21 is provided at its outer surface with a plurality of tools (such as bites and drills) equiangularly spaced apart with respect to the axis of rotation of the tool rest 21. Some tools T among the tools are freely rotatably supported by the tool rest 21. The tool rest 21 is formed with an annular space 21a within which a tool drive mechanism 22 is mounted on the cover plate 13a of the fixed blocks 13. The tool drive mechanism 22 comprises a tool drive casing 23 fixed to the cover plate 13a of the fixed blocks 13 by means of a plurality bolts (not shown), a first bevel gear 24 rotatably supported on the tool drive casing 23 through bearings 23A and 23B, a second bevel gear 25 disposed at right angles to the first bevel gear 24 to mesh with the first bevel gear 24 and rotatably supported on the tool drive casing 23 through bearings 33A and 33B, a tool rotating shaft 26 inserted into and spline coupled to the inner surface of the second bevel gear 25, a piston 28 freely slidably housed in a chamber 23c formed in the tool drive casing 23 so that the movement of the piston 28 can be transmitted to the tool rotating shaft 26 through a thrust bearing 27, a spring 29 interposed between the second bevel gear 25 and the tool rotating shaft 26 to urge the shaft 26 toward the piston 28, a fluid pressure passageway 30 formed in the motor casing 4, fixed block 13, cover plate 13a and in the tool drive casing 23 so that fluid under pressure is supplied to the chamber 23c through the passageway 30, and a stop member 31 screwed in the tool drive casing 23 and having its distal end which is received in a groove in the piston 28 for preventing rotation of the piston 28 but allowing axial movement of the piston 28. The above described first bevel gear 24 is spline coupled with the fore end portion 34a of the tool drive shaft 34, which is inserted in the hollow motor output shaft 3 and hollow tool-rest drive input shaft 8, so that rotation of the tool drive shaft 34 is transmitted to the tool rotating shaft 26 through the first and second bevel gears 24 and 25. When the tool rotating shaft 26 is lowered radially outward against a spring force of the spring 29 by the axial movement of the piston 28, it will engage with one of the rotational tools T supported on the tool rest 21 and drive it to rotate.

The tool drive shaft 34 is supported to the motor output shaft 3 through a pair of sleeves 35A and 35B coaxially of the motor output shaft 3, namely, coaxially with a center axis of rotation of the tool rest 21. At the rear end 34b of the tool drive shaft 34 having a toothed portion, the drive shaft 34 is connected to and disconnected from the motor output shaft 3 by means of a first clutch mechanism 36. The first clutch mechanism 36 comprises a clutch working chamber 37 formed in the motor casing 4, a clutch piston 38 freely slidably housed in the clutch working chamber 37, and a stop member 41 fixed to the clutch piston 38 by an annular snap ring 39 mounted in the clutch piston 38. The first clutch mechanism 36 further comprises a face coupling 42 fixed to the tool drive shaft 34 by a bolt 43 so that the radially inner portion of the toothed portion 42a of the face coupling 42 can mesh with the toothed portion 34b of the tool drive shaft 34 and rotatable with the clutch piston 38 when it is brought into engagement with the face coupling 42 through a thrust bearing 44, a toothed portion 45 formed in the rear end of the motor output shaft 3 so that it can the radially outer portion of the toothed portion 42a of the face coupling 42, and a dish spring 46 interposed between the motor casing 4 and the clutch piston 38 so that the clutch piston 38 and the face coupling 42 are moved away from the motor output shaft 3. The first clutch mechanism 36 is called a tooth clutch. As fluid under pressure is supplied to and discharged from one chamber within the clutch working chamber 37 through a fluid pressure passageway 47 formed in the motor casing 4, the face coupling 42 is connected to and disconnected from the toothed portion 45 of the motor output shaft 3. Thus, the connection and disconnection between the face coupling 42 and the motor output shaft 3 is performed by the first clutch mechanism 36. The tool drive shaft 34 is formed with a shoulder portion 34c in the vicinity of the rear shoulder portion of the tool-rest drive input shaft 8 and has mounted therein an annular snap ring 48 in the vicinity of the fore end of the tool-rest drive input shaft 8. Between the shoulder portion 34c and the rear shoulder portion of the tool-rest drive input shaft 8, there is provided a thrust bearing 49. Also, thrust bearings 50 are provided between the fore end of the tool-rest drive input shaft 8 and the annular snap ring 48. When the tool drive shaft 34 is caused to move axially outward (right direction of FIG. 1) by the clutch piston 38, the tool-rest drive input shaft 8 is moved away from the motor output shaft 3 through the shoulder portion 34c and thrust bearing 49. When, on the other hand, the tool drive shaft 34 is caused to move axially inward (left direction of FIG. 1) by the clutch piston 38, the tool-rest drive input shaft 8 is brought into contact with the motor output shaft 3 by the snap ring 48 mounted in the tool drive shaft 34 which is moving in the left direction. The fore end of the motor output shaft 3 is formed with a toothed portion, and the rear end of the tool-rest drive input shaft 8 facing the fore end of the motor output shaft 3 is formed with a toothed portion. When the tool-rest drive input shaft 8 is brought into contact with the motor output shaft 3 through these toothed portion, they will rotate as a unit member. Thus, the shoulder portion 34c of the tool drive shaft 34, snap ring 48 and the thrust bearings 49 and 50 constitute a second clutch mechanism 51 in cooperation with the first clutch mechanism 36. The first and second clutch mechanisms 36 and 51 are interposed between the servo motor 2 and the tool rest 21 and tool drive shaft 34, and constitute a power-transmission switch means 52 for switching a driving force from the servo motor 2 either to the tool rest 21 through the epicycle reduction gear 6 or directly to the tool drive shaft 34.

When the shoulder portion 34c of the tool drive shaft 34 is brought into contact with the rest-tool drive input shaft 8 by the clutch shaft 38 (when the rotational tool T is driven to rotate), the rest-tool drive input shaft 8 is fixed to the cover plate 13a of the fixed block 13 and to the tool drive casing 23 through a friction brake mechanism 52 (mechanical locking means). This friction brake mechanism 53 comprises a plurality of friction plates 55 spline connected to the tool-rest drive shaft 8, fixed plates 54 each disposed between two adjacent friction plates 55 and spline connected to the cover plate 13a of the fixed block 13, and a dish spring 56 rested on the tool drive shaft 34 in the vicinity of the friction plate 55. When the dish spring 56 is contracted by an axial load of the tool-rest driving input shaft 8 transmitted from the clutch piston 38 through the rotational tool drive shaft 34, rotation of the friction plates 55 will be prevented by a friction force produced at the time the dish plate 56 grips the friction plates 55. That is to say, the tool-rest driving input shaft 8 is mechanically locked and unlocked to the cover plate 13a of the fixed blocks 13 and to the tool drive casing 23 by the friction brake mechanism 53. When a workpiece is machined by a tool that does not require rotational motion, the tool rest 21 is normally fixed in a desired rotational position. However, in the embodiment described above, the stop position of rotation of the servo motor 2 is maintained constant in the state wherein the motor output shaft 3 and the tool-rest drive input shaft 8 are coupled together by the second clutch mechanism 51, and the tool rest 21 is fixed in a predetermined rotational position with the aid of the irreversibility of the epicycle reduction gear 6. That is to say, the rotational rest 21 can be servo locked in any rotational position by the servo motor 2 and the epicycle reduction gear 6.

It is noted that the tool-rest drive input shaft 8 is freely supported by a sleeve 57A fixed on the motor casing 4 and by a sleeve 57B fixed on the fixed block 13 and that the motor output shaft 3 is freely rotatably supported by bearings 58A and 58B fixed on the motor casing 4. Reference numeral 59 denotes an encoder which detects the number of rotations of the servo motor 2. Also, the servo motor 2 is controlled by a control circuit (not shown) in accordance with a predetermined program and in response to the detection signal from the encoder 59. Also, air under pressure or oil under pressure is supplied to the fluid pressure passageways 30 and 47 by a fluid-pressure supply means (not shown) that is controlled by the control circuit (not shown).

The operation will hereinafter be described in detail.

If the servo motor 2 and the fluid-pressure supply means (not shown) are actuated in accordance with a predetermined program by the control circuit described above, the motor output shaft 3 is connected either to the tool-rest drive input shaft 8 or to the tool drive shaft 34, and the driving force from the servo motor 2 is transmitted selectively to the tool-rest drive input shaft 8 or the tool drive shaft 34.

If it is now assumed that fluid under pressure is not supplied to the fluid pressure passageway 47, the clutch piston 38 of the first clutch mechanism 36 is caused to move in the left direction of FIG. 1 due to the spring force of the dish spring 46 and accordingly the tool drive shaft 34 coacting with the clutch piston 38 is moved in the left direction. As a consequence, the tool-rest drive input shaft 8 is urged toward the motor output shaft 3 through the snap ring 48 mounted in the tool drive shaft 34 and connected with the motor output shaft 3. Therefore, by rotating the servo motor 2, the tool-rest drive input shaft 8, together with the motor output shaft 3, rotates at a predetermined number of rotations. The rotation of the tool-rest drive input shaft 8 is reduced by the epicycle reduction gear 6. The reduced rotation is transmitted through the output member 9 of the epicycle reduction gear 6 to the tool rest 21 and then the tool rest 21 is slowly rotated into a desired rotational position. Then, when a workpiece is cut by a tool (e.g. bite) that does not require rotational motion, the resistance to cutting (main component of a force) is reduced with a reduction ratio of the epicycle reduction gear 6, and the cutting operation can be performed while the reduced resistance is being held by the servo lock of the servo motor 2. When, on the other hand, a workpiece is cut by a predetermined rotational tool T (e.g., drill), the tool rest 21 is rotated into a position in which the tool rotating shaft 26 is axially aligned with the predetermined rotational tool T and fluid under pressure is supplied to the clutch working chamber 37 through the fluid pressure passageway 47. This causes the clutch piston 38 to move in the right direction of FIG. 1 against the spring force of the dish spring 46. Consequently, the shoulder portion 34c of the tool drive shaft 34 coacting with the clutch piston 38 is moved in the right direction so that the motor output shaft 3 is disconnected from the tool-rest drive input shaft 8. At the same time, the tool-rest drive input shaft 8 is fixed to the cover plate 13a of the fixed block 13 and to the tool drive casing 23 by the friction brake mechanism 53, as described above. Since in this state the input gear 11 and the gear 12 are meshed with each other, the tool rest 21 is to be locked. At this time, the toothed portion 42a of the face coupling 42 is engaged with the toothed portion 45 of the motor output shaft 3. Therefore, the motor output shaft 3 is connected with the tool drive shaft 34 through the face coupling member 42 of the first clutch mechanism 36. Then, fluid under pressure is supplied to the chamber 23c through the fluid pressure passageway 30. This causes the piston 28 and accordingly the tool rotating shaft 26 to move radially outward against the spring force of the spring 29. As a result, the tool rotating shaft 26 engages with the predetermined rotational tool T. In this manner, the driving force from the servo motor 2 can be transmitted through the rotational-tool drive shaft 34 to the tool drive mechanism 22 and the cutting operation can be performed by the predetermined rotational tool T which is engaged by the rotating shaft 26.

Thus, in the embodiment of FIG. 1, the tool rest 21 and the tool drive shaft 34 can be selectively driven with the single servo motor 2 by providing the power transmission switch means 52 comprising the first and second clutch mechanisms 36 and 51. Unlike the conventional tool-rest driving device, two drive motors are not needed. In addition, since the center axes of rotation of the motor output shaft 3, tool-rest drive input shaft 8, annular ring 9 of the epicycle reduction gear 6 and the tool drive shaft 34 are axially aligned with the center axis of rotation of the rotational rest tool 21, these including the epicycle reduction gear 6 can be arranged on the same axis. As a result, the size of the tool-rest driving device can be reduced and at the same time the cost of tool-rest driving device reduced. In addition, since the tool rest 21 is servo locked in a predetermined rotational position by maintaining the stop position of rotation of the servo motor 2, the stepless dividing of the tool rest 21 can be performed and the tool rest 21 applied to a special machining method. For example, the depth of cut can be adjusted finely by slightly rotating the tool rest 21.

Figure 3:
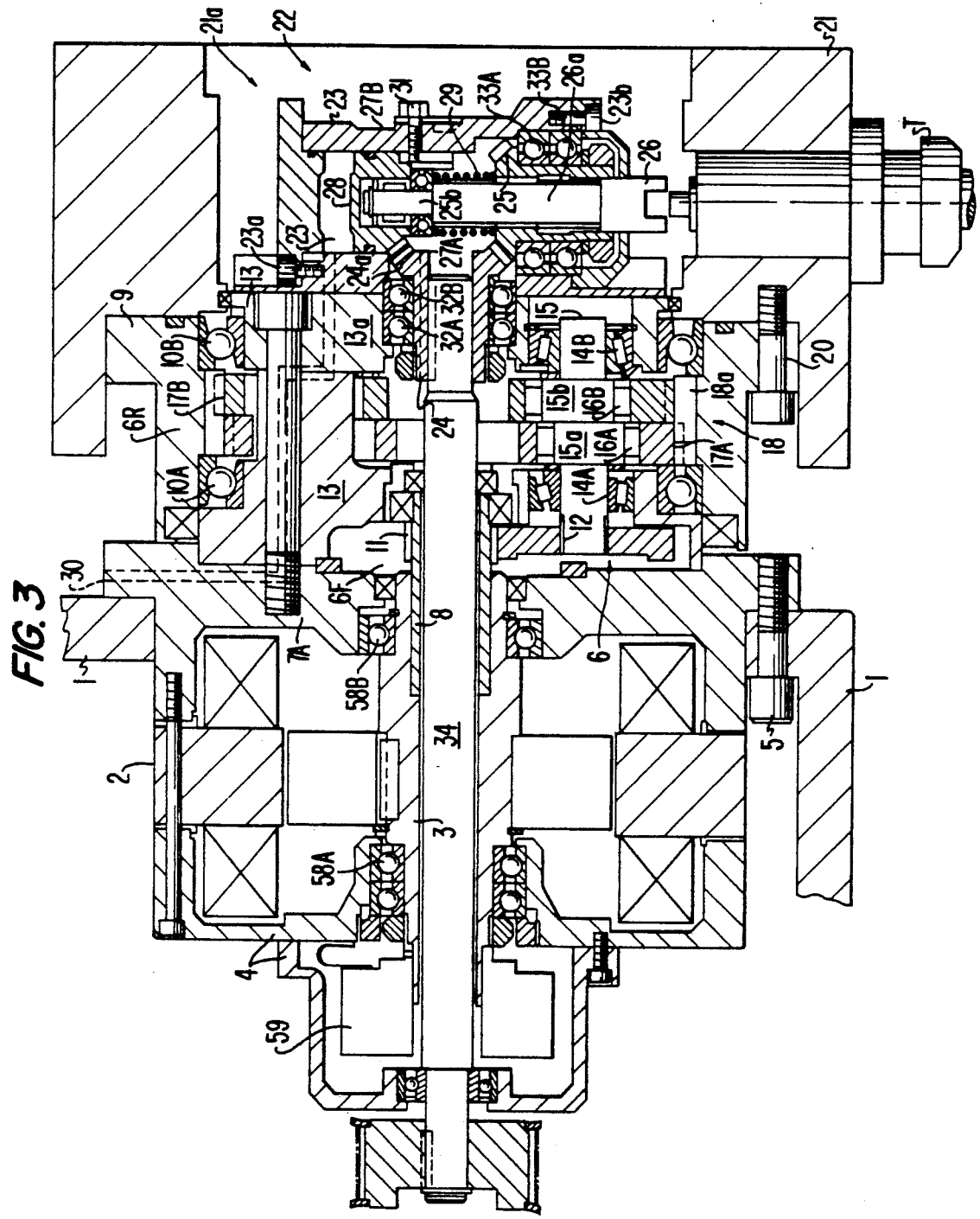
FIG. 3 is a longitudinal cross-sectional view showing a second embodiment of the tool-rest driving device.

FIG. 3 illustrates a second embodiment of the tool-rest driving device according to the present invention. Many of the parts of the embodiment of FIG. 3 are identical to corresponding parts of the embodiment of FIG. 1 and the same reference numerals will be applied to the corresponding parts. Therefore, a detailed description of the device of FIG. 3 will not be given. The tool-rest driving device shown in FIG. 3 comprises a drive motor 2 having its output shaft 3, a first rotatable shaft axially aligned with the motor output shaft 3 and driven to rotate by the motor output shaft 3, a tool rest 21 having at least one rotational tool T, and reduction gear means 6 arranged between the first rotatable shaft 8 and the tool rest 21 for reducing the number of rotations of the motor output shaft 3. The tool rest 21 is rotated at the reduced number of rotations. A second rotatable shaft 34 is arranged coaxially of the motor output shaft 3 for driving the rotational tools T of the tool rest 21. A center axis of the rotational shaft 34, a center axis of the reduction means 6 and an axis of rotation of the tool rest 21 are arranged on the same axis. The second rotatable shaft 34 extends through the reduction gear means 6. The reduction gear means 6 is constituted by an epicycle reduction gear comprising external tooth gears 17A and 17B and an internal tooth gear 18 meshing with the external tooth gears 17A and 17B. The internal tooth gear 18 is connected with the tool rest 21 through an annular ring member 9. Since in the embodiment of FIG. 3 the center axis of the rotational shaft 34, the center axis of the reduction means 6 and the axis of rotation of the tool rest 21 are arranged on the same axis, the size of the device can be reduced. In addition, since the second rotatable shaft 34 extends through the reduction gear means 6, the driving means can be made structurally simple.

Figure 4:
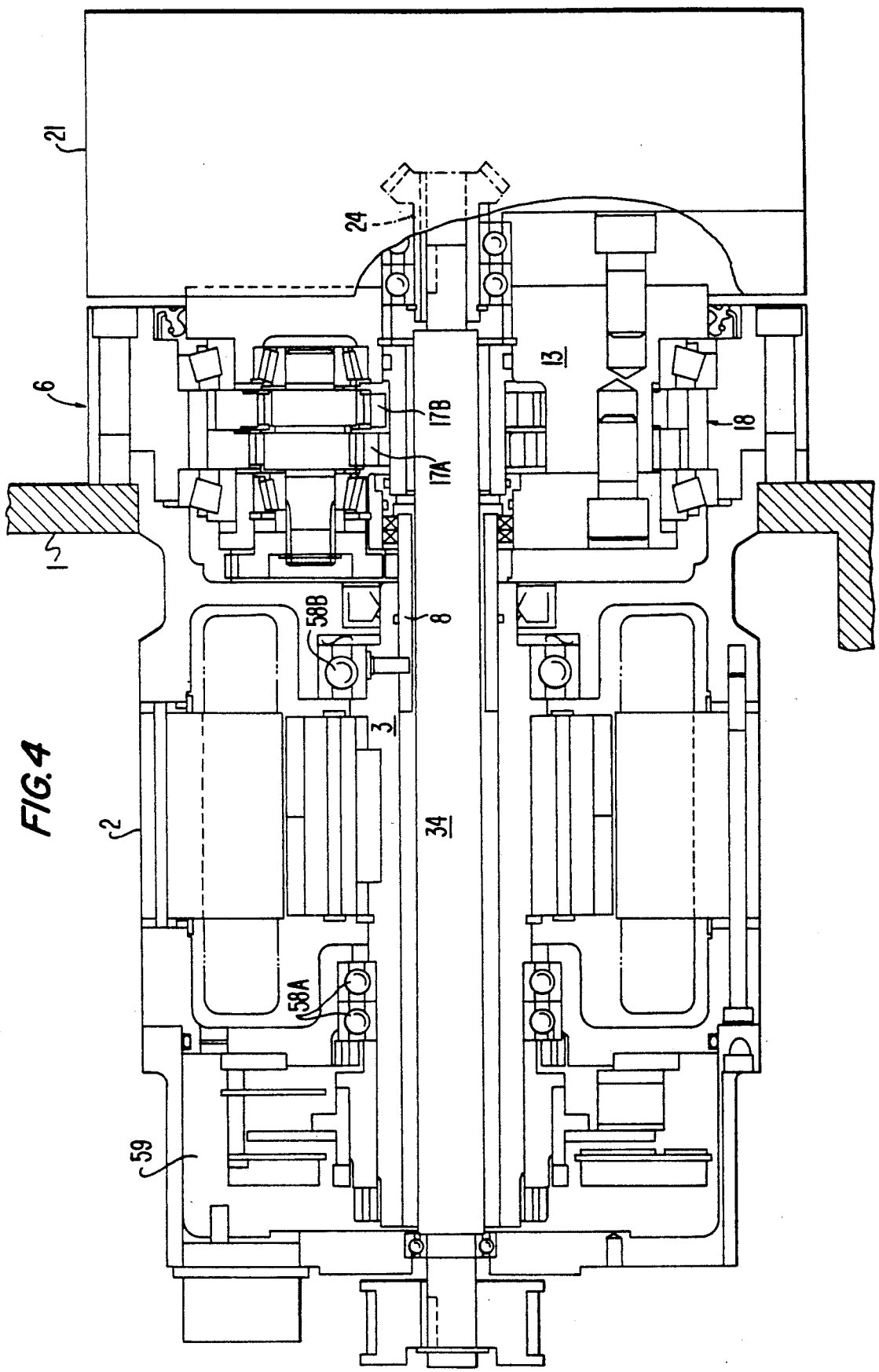
FIG. 4 is a longitudinal cross-sectional view showing a third embodiment of the tool-rest driving device.

FIG. 4 illustrates a third embodiment of the tool-rest driving device according to the present invention. The embodiment of FIG. 4 is substantially identical to the embodiment of FIG. 3 and therefore a detailed description of the device of FIG. 4 will not be given. The FIG. 4 embodiment is characterized in that the reduction gear means is constituted by an epicycle reduction gear 6 comprising external tooth gears 17A and 17B, an internal tooth gear 18 meshing with the external tooth gears 17A and 17B and a rotatable block 13 rotatably supporting the external tooth gears 17A and 17B, the external tooth gears 17A and 17B being connected through the rotatable block 13 to the tool rest 21. That is to say, in the embodiment of FIG. 3, the tool rest 21 is rotated by the internal tooth gear 18. On the other hand, in the embodiment of FIG. 4, the internal tooth gear 18 is fixed and the tool rest 21 is rotated by the external tooth gears 17A and 17B through the rotatable block 13.

Figure 5:
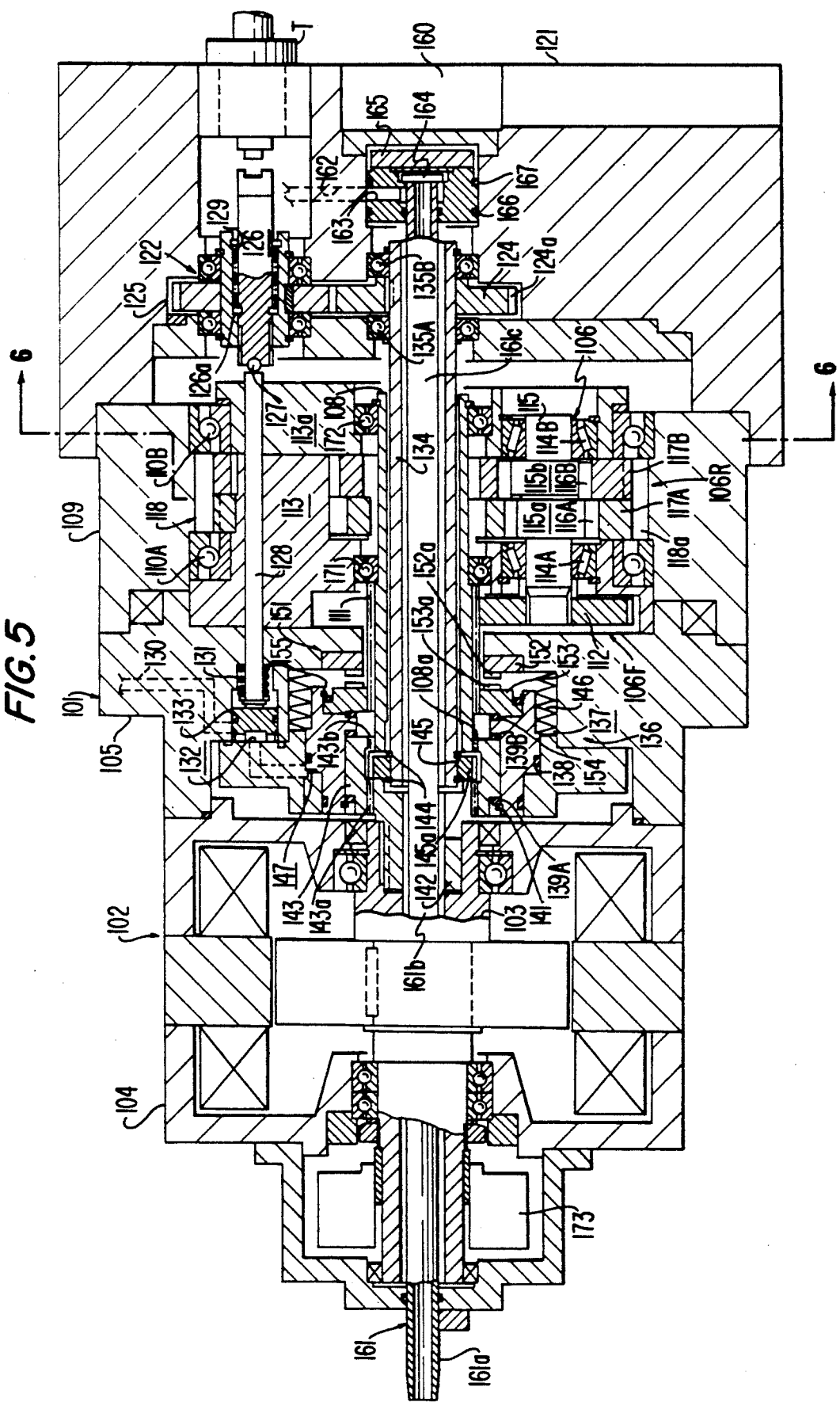
FIG. 5 is a longitudinal cross-sectional view showing a fourth embodiment of the tool-rest driving device.
Figure 6:
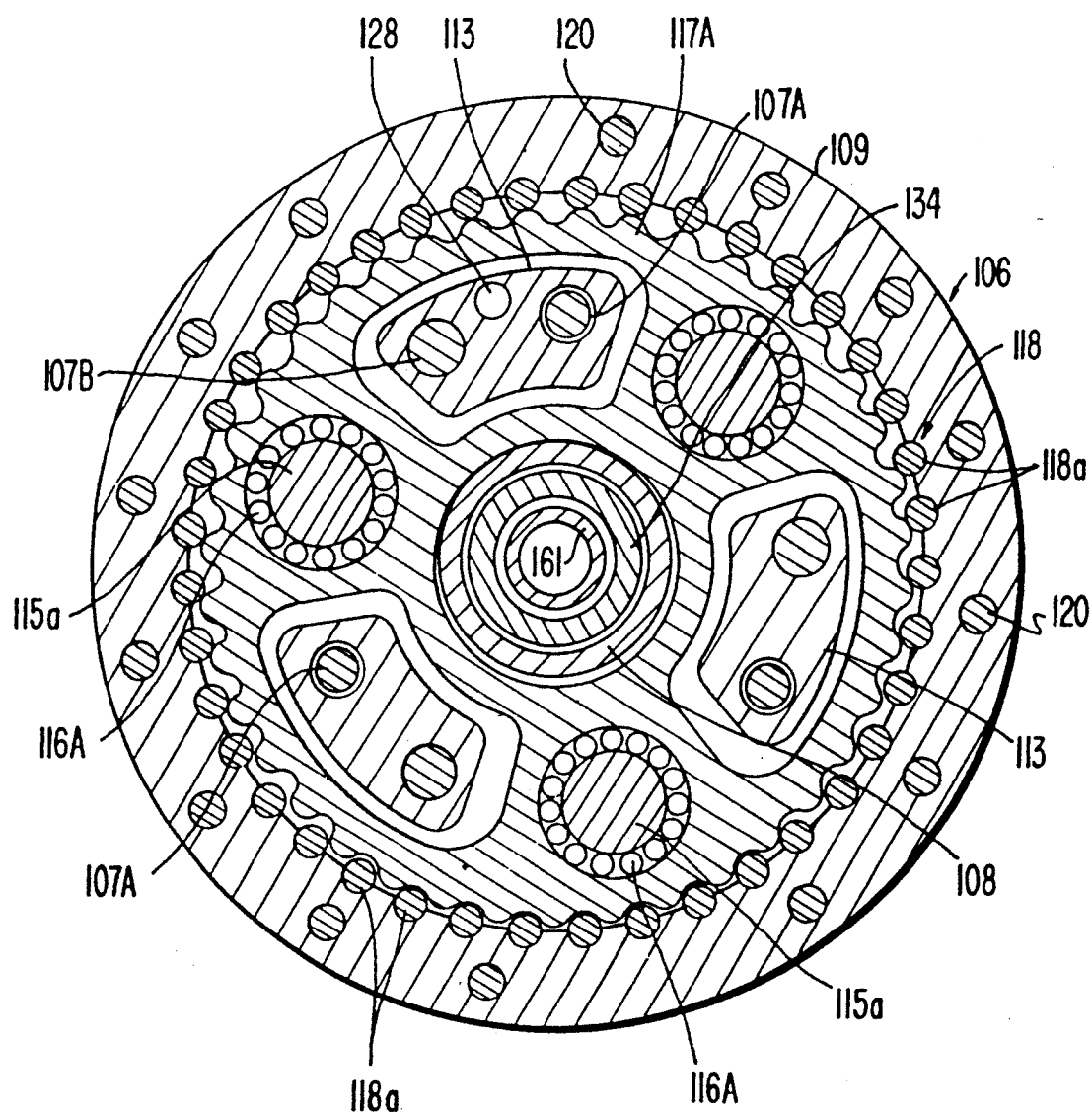
FIG. 6 is a cross-sectional view taken on line A—A of FIG. 5.

FIGS. 5 and 6 show a fourth embodiment of the tool-rest driving device according to the present invention. In FIGS. 5 and 6, reference numeral 101 is a supporting structure and reference numeral 102 is a servo motor. The servo motor 102 has a hollow output shaft 103 and is housed in a motor casing 104. The motor casing 104 is fixed to a fixed block (fixed part) 105 of the supporting structure 101. Also, fixed blocks 113 (FIG. 6) of an epicycle (planetary gear type) reduction gear 106 are fixed to the fixed block 105 of the supporting structure 101 by means of a plurality of bolts 107A and 107B (FIG. 6). A driving force from the servo motor 102 is transmitted to the epicycle reduction gear 106 through the motor output shaft 103 and through a tool-rest drive input shaft 108 axially aligned with the motor output shaft 103. The rotational speed transmitted to the tool-rest drive input shaft 108 is reduced and outputted through an annular ring 109 arranged coaxially of the tool-rest drive input shaft 108. The epicycle reduction gear 106 comprises a primary reduction gear part 106F and a secondary reduction gear part 106R. The primary reduction gear part 106F is constituted by an input gear 111 formed in the axially inner end portion of the tool-rest drive input shaft 108 and a driven gear 102 meshing with the input gear 111 and larger in teeth than the gear 111. Three fixed blocks 113 are fastened to the fixed block 105 of the supporting structure 101, and the annular ring 109 is freely rotatably supported on the fixed blocks 113 through bearings 110A and 110B. Each of three crank shafts 115 has a pair of circular eccentric portions 115a and 115b different in phase by 180° and is supported to the corresponding fixed block 113 and the cover plate 113a through bearings 114A and 114B. As clearly shown in FIG. 6, each crank shaft 115 is disposed between two adjacent fixed blocks 113 and 113. A pair of external tooth gears 117A and 117B are supported on the circular eccentric portions 115a and 115b through bearing 116A and 116B, respectively, so that the gears 117A and 117B are revolved with different phases of 180° around the tool-rest drive output shaft 108, as the crank shafts 115 are rotated. An internal tooth gear 118 is formed in the inner surface of the annular ring 109 and meshes with the external tooth gears 117A and 117B. The internal tooth gear 118 has a plurality of internal teeth (pins) 118a which are slightly increased in number than the external teeth of each of the external tooth gears 117A and 117B. The above described fixed blocks 113, crank shafts 115, external tooth gears 117A, 117B and the internal tooth gear 118 as a whole constitute the secondary reduction gear part 106R of the epicycle reduction gear 106. If the external tooth gears 117A and 117B are revolved around the tool-rest drive input shaft 108, the annular ring 109 will be rotated a small angle at a time in accordance with the difference in teeth between the external tooth gears 117A, 117B and the internal tooth gear 118.

A tool rest 121 is fastened to the annular ring 109 by means of a plurality of bolts 120 (FIG. 6) so that the tool rest 121 and the annular ring 109 can rotate on their axis axially aligned with an axis of rotation of the motor output shaft 103, as a unit member. The tool rest 121 is provided at its outer surface with a plurality of tools equiangularly spaced apart with respect to the center axis of the tool rest 121. Some tools T among the tools are freely rotatably supported by the tool rest 121. Within the tool rest 121, there are provided a plurality of tool drive units 122 corresponding in number to the rotational tools T. These tool drive units 122 are engaged by a single drive spur gear 124 having a toothed portion 124a at the periphery. One of the tool drive units 122 located in a desired position into which the tool rest 121 is rotated is driven by the drive spur gear 124. The drive spur gear 124 is fixedly mounted on a tool drive shaft 134, which extends through the central portion of the epicycle reduction gear 106 and is freely rotatable supported by bearings 135A and 135B. Each tool drive unit 122 comprises a driven spur gear 125 meshing with the drive spur gear 124, and a tool rotating shaft 126 (clutch member) having a rear end portion which is inserted in the driven spur gear 125 so that the shaft 126 can be spline coupled with the spur gear 125 and having a fore end engageable with the rotational tool T. The tool drive unit 122 further comprises a spring 129 which urges the tool rotating shaft 126 toward the left direction of FIG. 5 for releasing the spline coupling between the shaft 126 and the spur gear 125. The tool rotating shaft 126 is axially aligned with a clutch rod 128 which is axially slidably inserted into the fixed block 113 and cover plate 113a. At a predetermined rotational position of the tool rest 121, the tool rotating shaft 126 of one of the tool drive units 122 is brought into contact with the clutch rod 128 through a ball 27 received in the rear end of the tool rotating shaft 126. The clutch rod 128 is urged into contact with a clutch piston 133 by means of a clutch spring 131. A fluid pressure chamber 132 is formed between the fixed block 105 and the clutch piston 133 and communicated with a fluid pressure passageway 130. When fluid under pressure is supplied through the passageway 130 to the fluid pressure chamber 132, the clutch piston 133 is moved in the right direction of FIG. 5 and the clutch rod 128 and tool rotating shaft 126 are then moved in the right direction. With this state, a driving force from the drive spur gear 124 mounted on the tool drive shaft 134 is transmitted to the rotational tool T.

The rotatable tool drive shaft 134 is connected to and disconnected from the motor output shaft 103 by means of a clutch mechanism 136 provided in the fixed block 105. The clutch mechanism 136 can transmit the driving force from the motor 102 selectively either to the tool-rest drive input shaft 108 or to the tool drive shaft 134. The clutch mechanism 136 comprises a toothed portion 108a formed in the rear end of the tool-rest drive input shaft 108, a clutch working chamber 137 formed in the fixed block 105, a clutch piston 138 freely slidably housed in the clutch working chamber 137, a first coupling member 142 spline connected to the motor output shaft 103, and a second coupling member 143 having an axially inner toothed portion 143a meshing with the first coupling member 142 at the axially inner end of the member 143 and an axially outer toothed portion 143b meshing with the toothed portion 108a of the tool-rest drive input shaft 108 at the axially outer end of the member 143. The second coupling member 143 is freely rotatable supported on the clutch piston 138 through a pair of thrust bearings 139A and 139B and through a snap ring 141 mounted in the clutch piston 138. The clutch mechanism 136 further comprises a third coupling member 145 fixedly mounted on the tool drive shaft 134 through a pair of stop members 144 and 144 so that the outer toothed portion 145a of the member 145 can mesh with the inner toothed portion 143a of the second coupling member 143, a plurality of dish springs 146 provided between the fixed block 105 and the clutch piston 138 for urging the second coupling member 143 in the left direction of FIG. 5, and a pressure chamber 147 formed between the fixed block 105 and the clutch piston 138.

In addition, a tooth clutch 151 is provided within the fixed block 105 to lock the rotation of the tool-rest drive input shaft 108. The tooth clutch 151 comprises a stationary member 152 fixed to the fixed block 105 and having a toothed portion 152a, and a movable member 153 freely rotatable supported on the clutch piston 138 through a pair of thrust bearings 154 and through a snap ring 155. The movable member 153 is formed with a toothed portion 153a and a splined portion 153b spline connected to the tool-rest drive input shaft 108. By movement of the clutch piston 138, the toothed portion 153a of the movable member 153 is brought into engagement with the toothed portion 152a of the stationary member 152. When fluid under pressure is introduced into the pressure chamber 147 through the fluid pressure passageway 130 formed in the fixed block 105, the toothed portion 143a of the second coupling member 143 meshes with the toothed portion 145a of the third coupling member 145. As a result, a power transmission path from the motor output shaft 103 to the tool drive shaft 134 is connected. At the same time, the clutch piston 133 undergoes the fluid pressure within the fluid pressure chamber 132 and the clutch rod 128 is moved so that the tool rotating shaft 126 is brought into engagement with the spur gear 125. As a result, a power transmission path from the tool drive unit 122 to the rotational tool T is connected. Also, at this time, the movable and stationary members 152 and 153 are meshed with each other by movement of the clutch piston 138 and therefore rotation of the tool-rest drive input shaft 108 is mechanically locked. When, on the other hand, the fluid pressure within the pressure chambers 147 and 132 is released, the toothed portion 143b of the second coupling member 143 meshes with the toothed portion 108a of the tool-rest drive input shaft 108 and a power transmission from the motor output shaft 103 to the tool-rest drive input shaft 108 is connected. At the same time, the clutch rod 128 is moved by the spring 131 so that the tool rotating shaft 126 is disconnected from the spur gear 125, and therefore the power transmission path from the tool drive unit 122 to the rotational tool T is disconnected. Also, at this time, the movable member 153 is disconnected from the stationary member 151 and the lock of the tool-rest drive input shaft 108 is released.

In the embodiment shown in FIG. 5, there is provided a cutting-oil supply mechanism 160. The cutting-oil supply mechanism 160 comprises a cutting-oil supply pipe 161 (fixed pipe) arranged coaxially of the motor output shaft 103 fixed to the motor casing 104 and of the tool-rest drive input shaft 108, a plurality of cutting-oil passageways 162 extending radially from the central portion of the tool rest 121, and a supply port 163 that communicates with a predetermined cutting-oil passageway 162 corresponding to a predetermined rotational position into which the tool rest 121 is rotated. The cutting-oil supply mechanism 160 further comprises a distribution valve 165 locked to the cutting-oil supply pipe 161 by a whirl-stop member 164, and a pair of sealing rings 166 and 167 mounted in the periphery of the distribution valve 165 across the cutting-oil passageway 162. The cutting-oil supply pipe 161 has its one end portion 161a projecting from the drive motor 102, its intermediate portion 161b extending through the motor output shaft 103 and its other end portion 161c inserted into the tool rest 121. The distribution valve 165 is connected to the other end portion 161c of the distribution valve 165. When the tool rest 121 is rotated into a predetermined rotational position and the fixed supply port 163 is communicated with the cutting-oil passageway 162 coinciding with the predetermined rotational position of the tool rest 121, cutting oil supplied from a supply source of cutting oil (not shown) is supplied through the cutting-oil supply pipe 161 and through that cutting-oil passageway 162 to a predetermined rotational tool T which is being rotated by the tool drive unit 122.

It is noted that the tool-rest drive input shaft 108 is freely supported by a bearing 171 mounted on the fixed block 113 and a bearing 172 mounted on the cover plate 113a. Reference numeral 173 denotes an encoder which is provided in the vicinity of the motor output shaft 103 and detects a rotational position and the number of rotations of the servo motor 102. Also, the servo motor 102 is controlled by a control circuit (not shown) in accordance with a predetermined program and in response to the detection signal from the encoder 173. Also, air under pressure or oil under pressure is supplied to the fluid pressure passageways 130 by a fluid-pressure supply means (not shown) that is controlled by the control circuit (not shown).

The operation of the device shown in FIGS. 5 and 6 will hereinafter be described in detail.

If the servo motor 102 and the fluid-pressure supply means (not shown) are actuated in accordance with a predetermined program by the control circuit described above, the motor output shaft 103 is connected either to the tool-rest drive input shaft 108 or to the tool drive shaft 134 by the clutch mechanism 136, and the driving force from the servo motor 102 is transmitted selectively to the tool-rest drive input shaft 108 or the tool drive shaft 134.

If is it now assumed that fluid under pressure is not supplied to the fluid pressure passageway 130, the clutch piston 138 of the clutch mechanism 136 is caused to move in the left direction of FIG. 5 due to the spring force of the dish spring 146 and the motor output shaft 103 is rotated together with the tool-rest drive input shaft 108 through the second coupling member 143. As a consequence, a power transmission path from the servo motor 102 to the epicycle reduction gear 6 is connected and a power transmission path from the motor output shaft 103 to the tool drive shaft 134 is disconnected. Accordingly, the tool-rest drive input shaft 108, together with the motor output shaft 103, rotates at a predetermined number of rotations. The rotation of the tool-rest drive input shaft 108 is reduced by the epicycle reduction gear 106. The reduced rotation is transmitted through the output member 109 of the epicycle reduction gear 106 to the tool rest 121 and then the tool rest 121 is slowly rotated into a desired rotational position. Then, when a predetermined rotational tool T (e.g., drill) becomes axially aligned with the tool rotating shaft 126, the rotation of the servo motor 102 is stopped and the tool rest 121 is held in position. When, on the other hand, a workpiece is cut by a tool (e.g., bite) that does not need a rotational motion, the servo motor 102 is servo locked at the time that tool has reached a predetermined position and holds the load of rotational direction exerted on the tool edge.

With the state that the rotational tool T is axially aligned with the tool rotating shaft 126, if fluid under pressure is supplied to the fluid pressure passageway 130, the clutch piston 138 moves in the right direction of FIG. 5 and the toothed portion 143a of the second coupling member 143 meshes with the splined portion 145a of the third coupling member 145. Consequently, a power transmission path from the motor output shaft 3 to the tool drive shaft 134 and to the tool drive unit 122 is connected. At this time, the clutch rod 128 is axially moved in the right direction of FIG. 5 against the spring force of the spring 131 by the clutch piston 133 which received the fluid pressure within the pressure chamber 132. This causes the tool rotating shaft 126 to engage with the rotational tool T. Also, the tool-rest drive input shaft 108 is mechanically locked to the fixed block 113 by means of the tooth clutch 151.

With this state, if the servo motor 2 is driven, the driving force is transmitted to one of the tool drive units 122 through the tool drive shaft 134 and the rotational tool T engaged by the tool rotating shaft 126 is driven to rotate. In the embodiment of FIG. 5, the external tooth gears 117A and 117B of the epicycle reduction gear 106 are provided in the corresponding fixed block 113 and the clutch rod 128 extends through one of the fixed blocks 113. The tool rotating shafts 126 of the individual tool drive units 122 are arranged on the same radius position as the clutch rod 128 so that they are brought into engagement with the clutch rod 128 by the spring 129. A power transmission path from the spur gear 124 to the rotational tool T is connected by one of the tool rotating shafts 126 moved in the right direction by the clutch rod 128, and this power transmission path is disconnected by that tool rotating shaft 126 moved in the left direction by the spring 129.

Since in the embodiment of FIG. 5 there is provided the power-transmission switch means 136, the epicycle reduction gear 106 or the rotational tool drive shaft 134 is selectively driven by means of the single drive motor. As a result, the device can be reduced in size and made structurally simple. In addition, when the axially movable tool rotating shaft 126 is axially moved and brought into contact with the axially movable clutch rod 128, a power transmission path from the rotational tool drive shaft 134 to the tool drive unit 122 is disconnected. Accordingly, the structure for connecting and disconnecting the power transmission path can be made structurally simple. In addition, the cutting-oil supply mechanism 160 for supplying cutting oil to the tool is supported on the tool rest 121. Accordingly the device can be reduced in size and made structurally simple.

Although the invention has been described with a certain degree of particularity, it is understood that the present disclosure has been made only by way of example and that numerous changes in the details of the construction and the combination and arrangement of parts may be made without departing from the scope of the invention as hereinafter claimed.

What we claim is:

1. A tool-rest driving device comprising:
   a drive motor having its output shaft;
   a first rotatable shaft axially aligned with the motor output shaft and driven to rotate by said motor output shaft;
   a tool rest having at least one rotational tool;
   reduction gear means arranged between said first rotatable shaft and said tool rest for reducing the number of rotations of said motor output shaft, said tool rest being rotated at the reduced number of rotations; and
   a second rotatable shaft arranged coaxially of said motor output shaft, said second rotatable shaft being cooperable with means for driving said rotational tool of said tool rest;
   the center axes of said rotational shafts, a center axis of said reduction gear means and an axis of rotation of said tool rest being arranged on the same axis.

2. A tool-rest driving device as set forth in claim 1, wherein said second rotatable shaft extends through said reduction gear means.

3. A tool-rest driving device as set forth in claim 1, wherein said reduction gear means is constituted by an epicycle reduction gear comprising external tooth gears and an internal tooth gear meshing with said external tooth gears, said internal tooth gear being connected with said tool rest.

4. A tool-rest driving device as set forth in claim 1, wherein said reduction gear means is constituted by an epicycle reduction gear comprising external tooth gears, an internal tooth gear meshing with said external tooth gears and a rotatable block rotatably supporting said external tooth gears, said external tooth gears being connected through said rotatable block to said tool rest.

5. A tool-rest driving device comprising:
   a single drive motor having an axis of rotation;
   a tool rest having an axis of rotation axially aligned with said axis of rotation of said single drive motor and having a plurality of rotational tools supported thereon;
   a support structure including a first support block having said tool rest freely rotatably supported thereon and a second support block having said single drive motor fixed thereto;
   an epicycle reduction gear attached to said first support block of said support structure for reducing the number of rotations of said single drive motor, said tool rest being rotated at the reduced number of rotations;
   a plurality of tool drive units rotatably supported on said tool rest for driving said rotational tools;
   a rotational tool drive shaft having an axis of rotation axially aligned with said axis of rotation of said single drive motor and extending through a central portion of said epicycle reduction gear and driving said tool drive units; and
   power-transmission switch means provided in said second support block for transmitting a driving force from said single drive motor selectively either to said epicycle reduction gear or to said rotational tool drive shaft.

6. A tool-rest driving device comprising:
   a drive motor having an axis of rotation;
   a tool rest having an axis of rotation axially aligned with said axis of rotation of said drive motor and having a plurality of rotational tools supported thereon;
   a support block having said tool rest freely rotatably supported thereon;
   an epicycle reduction gear attached to said support block for reducing the number of rotations of said drive motor, said tool rest being rotated at the reduced number of rotations;
   a plurality of tool drive units rotatably supported on said tool rest for driving said rotational tools;
   a rotational tool drive shaft having an axis of rotation axially aligned with said axis of rotation of said drive motor and extending through a central portion of said epicycle reduction gear and driving said tool drive units; and
   an axially movable clutch rod extending through said support block in parallel relationship with said axis of rotation of said rotational tool drive shaft;
   each of said tool drive units including an axially movable tool rotating shaft and when said axially movable clutch rod is axially moved toward said axially movable tool rotating shaft and brought into contact with said axially movable tool rotating shaft, a power transmission path from said rotational tool drive shaft to the tool drive unit being connected.

7. A tool-rest driving device comprising:
   a drive motor having an axis of rotation;
   a tool rest having an axis of rotation axially aligned with said axis of rotation of said drive motor and having a plurality of rotational tools supported thereon;

a support block having said tool rest freely rotatably supported thereon;

an epicycle reduction gear attached to said support block for reducing the number of rotations of said drive motor, said tool rest being rotated at the reduced number of rotations;

a plurality of tool drive units rotatably supported on said tool rest for driving said rotational tools;

a rotational tool drive shaft having an axis of rotation axially aligned with said axis of rotation of said drive motor and extending through a central portion of said epicycle reduction gear and driving said tool drive units; and a cutting-oil supply mechanism for supplying cutting oil to said tools supported on said tool rest, said cutting-oil supply mechanism including a cutting-oil supply pipe having its one end portion projecting from said drive motor and its other end portion inserted into said tool rest, a plurality of cutting-oil passageways extending radially from a central portion of said tool rest, and a valve for communicating said cutting-oil supply pipe with one of said plurality of cutting-oil passageways which corresponds to a rotational position into which said tool rest is rotated.

8. A tool-rest driving device comprising:

a single servo drive motor;

a tool rest having at least one rotational tool and driven through a reduction gear train to rotate by said single drive motor;

a tool drive shaft driven to rotate by said single drive motor for rotating said rotational tool supported on said tool rest; and power-transmission switch means interposed between said single drive motor and said tool drive shaft and tool rest for selectively transmitting a driving force from said single drive motor either to said tool rest or to said tool drive shaft, wherein said tool rest is servo locked in a predetermined rotational position through said reduction gear train by maintaining a rotational stop position of said drive motor.

9. A drive device comprising:

a single drive motor having its output shaft;

a tool rest having an axis of rotation axially aligned with said axis of rotation of the motor output shaft and having at least one rotational tool supported thereon;

a first rotatable and axially movable shaft axially aligned with the motor output shaft and driven to rotate by said motor output shaft;

an epicycle reduction gear provided between said first rotatable and axially movable shaft and said tool rest for reducing the number of rotations of said single drive motor, said tool rest being rotated at the reduced number of rotations;

a tool drive unit provided within said tool rest for driving said rotational tools;

a second rotatable and axially movable shaft having an axis of rotation axially aligned with said axis of rotation of said single drive motor and extending through a central portion of said epicycle reduction gear and driving said tool drive unit; and power-transmission switch means interposed between said single drive motor and said first and second rotatable and axially movable shafts for selectively transmitting a driving force from said motor output shaft either to said first rotatable and axially movable shaft or to said second rotatable and axially movable shaft;

said driving force from said motor output shaft being transmitted to said first shaft when said second shaft is axially moved in one direction by said power-transmission switch means and being transmitted to said second shaft when said second shaft is axially moved in another direction by said power-transmission switch means.

10. A tool-rest driving device as set forth in claim 9, which further comprises a friction brake mechanism which mechanically locks said first shaft to said tool drive unit at the time said rotational tool is driven to rotate.

* * * * *